(12) United States Patent
Kommareddi et al.

(10) Patent No.: US 9,644,161 B2
(45) Date of Patent: May 9, 2017

(54) PLASTICIZED LATEX FORMULATIONS FOR IMPROVED PUMPABILITY

(71) Applicant: Baker Hughes Incorporated, Houston, TX (US)

(72) Inventors: Nagesh S. Kommareddi, Tulsa, OK (US); Keith D. Fairchild, Sand Springs, OK (US); Jack B. Ward, Tulsa, OK (US); Ross Poland, Houston, TX (US); Jerry J. Weers, Richmond, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/606,626

(22) Filed: Jan. 27, 2015

(65) Prior Publication Data

US 2015/0291903 A1    Oct. 15, 2015

Related U.S. Application Data

(60) Provisional application No. 61/978,272, filed on Apr. 11, 2014.

(51) Int. Cl.

| | |
|---|---|
| *C10L 10/00* | (2006.01) |
| *C10L 10/08* | (2006.01) |
| *C08K 5/05* | (2006.01) |
| *C10L 1/14* | (2006.01) |
| *C10G 71/00* | (2006.01) |
| *C10M 169/04* | (2006.01) |
| *C08L 33/08* | (2006.01) |

(52) U.S. Cl.
CPC .............. *C10L 10/08* (2013.01); *C08K 5/05* (2013.01); *C08L 33/08* (2013.01); *C10G 71/00* (2013.01); *C10L 1/143* (2013.01); *C10M 169/04* (2013.01); *C10L 2200/0259* (2013.01); *C10L 2230/14* (2013.01); *C10L 2250/04* (2013.01); *C10L 2270/023* (2013.01); *C10L 2270/026* (2013.01)

(58) Field of Classification Search
CPC .. C10L 10/08; C10L 1/143; C10L 2200/0259; C10L 2230/14; C10L 2250/04; C10L 2270/023; C10L 2270/026; C08K 5/05; C10G 71/00; C08L 33/08; C10M 169/04
See application file for complete search history.

(56) References Cited

U.S. PATENT DOCUMENTS

| | | | | |
|---|---|---|---|---|
| 2,697,071 | A | * 12/1954 | Kennedy | .................. C09K 8/36 106/285 |
| 3,857,402 | A | * 12/1974 | Schuh | ...................... C09K 3/00 137/13 |
| 4,983,186 | A | 1/1991 | Naiman et al. | |
| 5,110,874 | A | 5/1992 | Naiman et al. | |
| 7,285,582 | B2 | 10/2007 | Harris et al. | |
| 7,763,671 | B2 | 7/2010 | Harris et al. | |
| 8,022,118 | B2 | 9/2011 | Milligan et al. | |
| 8,215,930 | B2 | 7/2012 | Burden et al. | |
| 8,342,198 | B2 * | 1/2013 | Asomaning | .......... C10M 145/20 137/13 |
| 8,450,251 | B2 | 5/2013 | Milligan et al. | |

\* cited by examiner

*Primary Examiner* — Cephia D Toomer
(74) *Attorney, Agent, or Firm* — Mossman Kumar & Tyler PC

(57) ABSTRACT

Hydrocarbon streams, such as crude oil streams, may have reduced drag when an effective amount to reduce drag of a drag reducing composition is added to a liquid hydrocarbon, where the drag reducing composition includes a drag reducing latex comprising at least one plasticizer in an amount effective to improve the ability to pump the latex into a hydrocarbon composition or stream with assured flow of the latex. Latex formulations are known to cause agglomerated particles during pumping operations, and the agglomerated hard particles tend to plug check valves in injection pump equipment, but the inclusion of at least one plasticizer reduces or prevents such problems.

18 Claims, No Drawings

PLASTICIZED LATEX FORMULATIONS FOR IMPROVED PUMPABILITY

CROSS-REFERENCE TO RELATED APPLICATION

This application claims the benefit of U.S. Provisional Patent Application Ser. No. 61/978,272 filed Apr. 11, 2014, incorporated herein by reference in its entirety.

TECHNICAL FIELD

The invention relates to hydrocarbon streams and methods for making them where the hydrocarbon streams contain a drag reducing composition, and more particularly relates, in one non-limiting embodiment, to hydrocarbon streams and methods for making them where the hydrocarbon streams contain a drag reducing composition that comprises a latex, and in an additional non-limiting embodiment relates to improved drag reducing latexes.

TECHNICAL BACKGROUND

The use of drag reducing agents to reduce the effect of friction ("drag") experienced by a liquid hydrocarbon, such as crude oil, flowing through a hydrocarbon transportation pipeline is well-known in the art. Reduction of the drag decreases the amount of energy needed to accomplish such flow, and therefore also decreases the costs associated with pumping. These materials, often called drag reducing agents (DRAs), can take various forms, including certain polymers in the forms of latexes, oil soluble suspensions, emulsions, pellets, gels, microfine powders and particulate slurries. Particulate slurries that comprise ground polymers are often one of the most cost effective forms. One goal is a DRA that rapidly dissolves in the flowing hydrocarbon and that has a polymer content sufficient to ensure that the desired level of drag reduction is achieved.

However, in the case of the DRA being a latex, latex formulations are well known to have the problem of the latex particles agglomerating during pumping operations. These agglomerated particles tend to be very hard and consequently may plug check valves in injection pump equipment leading to injection failure. The latex particles may agglomerate or accumulate or collect into masses that cause other flow assurance problems. While "flow assurance" and "assured flow" are terms used in the oil and gas industry to mean ensuring successful and economical flow of a hydrocarbon stream from a subterranean reservoir to the point of sale, these terms as used herein are defined to mean ensuring successful flow of a latex DRA, whether the latex DRA is neat or is in a drag reducing composition or is within a hydrocarbon stream.

Thus, it would be desirable if a hydrocarbon stream and a method for producing such a stream could be developed that prevents or inhibits latex DRA particles from agglomerating to an extent that they become troublesome or inhibits or prevents flow economically.

SUMMARY

There is provided, in one form, a method of preparing a hydrocarbon composition including introducing into a liquid hydrocarbon an effective amount of a drag reducing composition to reduce the drag of the hydrocarbon composition. The liquid hydrocarbon may include, but is not necessarily limited to, crude oil, heavy oil, gasoline, diesel fuel, fuel oil, naphtha, asphalt, and mixtures thereof. The drag reducing composition includes a drag reducing latex that in turn comprises at least one plasticizer in an amount effective to improve the ability to pump the drag reducing latex into the hydrocarbon composition, for instance with assured flow.

In another non-limiting embodiment, there is provided a hydrocarbon composition having reduced drag, which the hydrocarbon composition includes a liquid hydrocarbon that may include, but is not necessarily limited to, crude oil, heavy oil, gasoline, diesel fuel, fuel oil, naphtha, asphalt, and mixtures thereof. The hydrocarbon composition also includes a drag reducing composition which in turn includes a drag reducing latex comprising at least one plasticizer in an amount effective to improve the ability to pump the drag reducing latex into the hydrocarbon composition with assured flow.

DETAILED DESCRIPTION

It has been discovered that the addition of one or more plasticizers to a latex drag reducing additive (DRA) causes the latex DRA particles to swell and also to soften. Even if these swollen latex polymer particles agglomerate, the flexibility imparted by the plasticization effect, allows them to pass through the check valves of a flow line without plugging them and leading to pump failure.

The liquid hydrocarbons which compose the hydrocarbon composition may include, but are not necessarily limited to, crude oil, heavy oil, gasoline, diesel fuel, fuel oil, naphtha, asphalt, and mixtures thereof. "Crude oil" is defined to include heavy crude oil. As defined herein, the hydrocarbon composition includes hydrocarbon streams whether flowing or at rest, and also includes hydrocarbons above ground and below ground (e.g., pipelines), in rail cars, tank trucks, barges, ships including those undergoing loading or unloading, as well as oilfield down hole crude oil applications, as well as transfer lines from storage to refineries, from refinery to storage of produced products, tank to tank transfer in refinery process units, and combinations of these.

The latex DRA particles may be formed by polymerizing at least one monomer selected from the group consisting of acrylates, methacrylates including, but not necessarily limited to, 2-ethylhexyl methacrylate, isobutyl methacrylate, butyl methacrylate, styrene, acrylic acid, and combinations thereof. More specifically, the latex DRA polymers are typically formed by polymerizing 2-ethylhexyl methacrylate, isobutyl methacrylate, butyl methacrylate, acrylates including, but not necessarily limited to, 2-ethylhexyl acrylate, isobutyl acrylate, butyl acrylate—generally C1 to C6 alcohol esters of acrylic acid or methacrylic acid, where styrene and acrylic acid are also added in small amounts to make a terpolymer. The latex DRA particles are made to have high molecular weights, defined herein as in excess of five million g/mol. In another non-limiting embodiment the polymer has a weight average molecular weight of at least $1\times10^6$ g/mol, alternatively at least $5\times10^6$ g/mol, and in another non-restrictive version at least $6\times10^6$ g/mol. After the high molecular weight latex is made, an oil soluble amine-containing compound is added as a dissolution enhancing agent. Suitable compounds include, but are not necessarily limited to mono, di, and tri polyetheramines (such as those comprising the Eastman JEFFAMINE® product line) as well as other oil soluble polyamines.

As noted, it has been discovered that a plasticizer, such as 2-ethylhexyl alcohol, may be added to the latex on the order of about 10 wt % alcohol to about 90 wt % latex. This incorporation or addition may be done inline using static mixers or may be added to an agitated tank containing the latex DRA particles. After mixing is complete, the latex may be put into an injection test rig, where it is pumped against a high pressure relief valve to simulate injection into a pipeline, such as is done in the injection of latex DRA particles into a flowing hydrocarbon stream, such as crude oil. Pressures and flow rates are monitored for deviations from expectations. A pressure spike or flow rate decrease would indicate problem.

Several examples in the literature suggest specially modified diaphragm pumps may be suitable for overcoming the latex plugging issues described above. However, the novel compositions described herein provides a method to use conventional drag reducer injection pumps to deliver latex drag reducer into pipelines in a reliable manner.

More specifically, the at least one plasticizer may include, but is not necessarily limited to glycols, polyglycols, glycol ethers, esters, aliphatic alcohols (e.g. 2-ethylhexyl alcohol, isoheptanol, isohexanol, isodecanol, 1-hexanol, 1-octanol, nonanol), paraffinic and isoparaffinic solvents, white and mineral spirit blends, aromatic alcohols, ketones, aldehydes, aromatic solvents (e.g. toluene, xylene and mixtures thereof), and combinations thereof.

The weight ratio of the at least one plasticizer to the latex may range from about 1/99 independently to about 30/70; alternatively from about 5/95 independently to about 20/80; and in a different non-limiting embodiment from about 7/93 independently to about 10/90. The use of the term "independently" herein with respect to a range means that any lower threshold may be combined with any upper threshold to provide a suitable alternative range.

The effective amount of the drag reducing composition, also called plasticized latex herein, in the hydrocarbon to reduce drag (lower friction) of the hydrocarbon may range from about 500 independently to about 1 ppm, alternatively from about 25 independently to about 150 ppm plasticized latex. It will be appreciated that the optimum amount of drag reducing composition for any situation will depend on a number of factors including, but not necessarily limited to, the composition of the liquid hydrocarbon, the properties of the hydrocarbon, the composition of the drag reducer, the temperature of the hydrocarbon, the flow rate of the hydrocarbon, and combinations of these. It will be appreciated that DRA products typically only work if they are injected into a stream flowing under turbulent conditions. Turbulent conditions are driven by flow rate. However, it will be appreciated that the drag reducing compositions described herein may exhibit benefit not only in the fully turbulent regime, but also more generally, and particularly in the transitional flow region between turbulent and laminar flow conditions. It may be possible that true turbulent flow conditions may not exist, but drag reducing may still occur depending on a particular combination of flow rate, temperature, viscosity and/or other factors.

The plasticizer may be added after the latex particles are already formed, or alternatively, may be added to the monomer prior to polymerization. In other words, in this latter embodiment, it is possible to get the same plasticizing effect by diluting the monomer with a solvent on the front end of the process of making the latex. A solvent would need to be selected that is substantially insoluble in water and is a solvent for both the monomer and the polymer being produced. Essentially, instead of conducting the reaction where the dispersed phase is 100% monomer, a mixture of monomer and plasticizer/solvent would be used, in a non-limiting example, 80 wt % monomer and 20 wt % solvent. Suitable solvents may include, but are not necessarily limited to, kerosene, toluene, xylene, C6-C16 alkanes or cycloalkanes, toluene, mineral oil solvents, and the like and combinations thereof. In another non-limiting embodiment, the lower threshold of the weight ratio of at least one plasticizer to monomer ranges from about 1/99 independently to about 20/80; alternatively from about 10/90 independently to about 5/95.

Upon completion of the polymerization reaction, the monomer might fully (100%) convert to polymer, but the plasticizer/solvent will restrict the % polymer in each latex particle to 80 wt % (the monomer percentage in the original mixture). It would be expected to have the same plasticization effect of, say, post-adding 10% kerosene to a finished latex polymer which has 40% latex polymer (at 100% conversion). So in this case the plasticized latex polymer would be 40 parts polymer and 10 parts kerosene and therefore 80% polymer and 20% kerosene.

In another non-limiting embodiment, the drag reducing latex may be made in a winterized version, meaning that it may be stored and used at colder temperatures while maintaining its stability, that is, that one or more of the component parts do not freeze or otherwise become unsuitable for use. For instance, a water-based or water-containing latex may have the plasticizer added to it, and for a winterized latex, part of the water may be replaced before the polymerization reaction starts with a winterizing additive including, but not necessarily limited to, ethylene glycol, propylene glycol, and mixtures thereof. The polymerization reaction would then proceed in a similar fashion to make the latex polymer, and the plasticizer would be added later. Alternatively, in the embodiment mentioned above for diluting the monomer to get the plasticization effect, part of the water would be replaced prior to latex polymerization with the a winterizing additive including, but not necessarily limited to ethylene glycol, propylene glycol, and mixtures thereof.

The latex DRA polymers, described herein, are especially effective in reducing drag in heavy crude oil which has high asphaltene content. "High asphaltene content" is defined here as at least about 3 wt %, in one non-restrictive version at least about 5 wt %, alternatively at least 10 wt %, even over 20 wt %. Alternative definitions of "high asphaltene content" include an API gravity of 26° or less; in another non-limiting embodiment an API gravity of 22° or lower. Asphaltenic heavy crude oil is typically diluted with gasoline or naphtha by about 30 wt % to reduce the viscosity enough to be able to pump the heavy crude oil. The diluent is recycled and adds considerable expense to the task of pumping high asphaltenic crude oils. Suitable diluents include, but are not necessarily limited to, gasoline, natural gasoline, naphtha, condensate, and combinations thereof. More specifically, the naphtha usually comes from an oilfield heavy crude oil upgrader unit. The diluents are often recycled too. Diluents are added to the heavy crude oil to dilute it so it can be shipped through a pipeline, from Canada to the USA for example. In the USA, the naphtha is stripped off and sent back to Canada to be reused to dilute more heavy crude oil and send it down the pipeline. Certain asphaltene inhibitors and demulsifiers, including but not necessarily limited to, combinations of oxyalkylated alkyl phenol formaldehyde resins, oxyalkylated polyamines, and oxyalkylated glycols have shown performance as viscosity reduction additives, where adding up to 1 wt % of a viscosity reducer could give the same effect as 5 wt % diluent. There can thus be determined a point at which there is an economic advantage to adding viscosity reducer so that the amount of diluent added may be reduced.

Further, a combination of viscosity reducer for asphaltenic heavy crude oil and latex drag reducer would be especially beneficial because more heavy crude oil could then be transported with less diluent and also at higher throughputs. The latex drag reducers used in this embodiment would be the same ones noted as suitable above. In this embodiment for high asphaltenic crude oils, a weight ratio of 95/5 to 80/20 for the latex to plasticizer may be suitable. The viscosity reducer, also known as asphaltene stabilizers, may include, but are not necessarily limited to, phenol formaldehyde resins phenol formaldehyde resins substituted with alkyl groups ranging from butyl to dodecyl, phenol formaldehyde resins oxyalkylated with an alkylene oxide selected from the group consisting of ethylene oxide, propylene oxide, butylene oxide styrene oxide, glycidyl ethers, diglycidyl ethers, and combinations thereof, where the ratio of alkylene oxide to phenol ranges from 1 to 20 per mole of alkylene oxide to phenol, Mannich reaction products (i.e. reaction products of a phenol with formaldehyde and a polyamine including, but not necessarily limited to, ethylenediamine or diethylenetriamine, triethylenetetraamine), bases selected from the group consisting of imidazolines, polyamines, tetra ethyl pentamine, magnesium overbases, and combinations thereof.

If the asphaltenes drop out of the crude oil when it is diluted, the viscosity will increase dramatically. Thus, by including these asphaltene stabilizers/viscosity reducers, the viscosity may be kept "lower" and hence there is a better opportunity to reduce the drag of the crude oil with the latex drag reducer. In one non-limiting embodiment the weight ratio of plasticized latex/asphaltene stabilizer ranges from about 95/5 plasticized latex/asphaltene stabilizer independently to about 50/50 on a weight basis to about 0.001/99.999 on a weight basis; alternatively from about 95/5 independently to about 1/99.

In one non-limiting embodiment the at least one viscosity reducer is present in the asphaltenic hydrocarbon in an amount from about 1 ppm independently to about 10,000 ppm, alternatively from about 100 ppm independently to about 1000 ppm.

When the plasticizer described herein is used in the latex DRA particles in these crude oils with high asphaltenic contents, the amount of diluent is reduced as compared to an otherwise identical hydrocarbon stream absent the plasticizer, where the hydrocarbon stream and the otherwise identical hydrocarbon stream have essentially the same drag characteristics when pumped under essentially the same conditions. Alternatively, the total amount of diluent in the hydrocarbon stream that may be reduced may range from about 2 wt % independently to about 5 wt %. A reduction in diluent content of from about 3 to about 5 wt % is the amount seen in past testing on heavy Canadian crude oil less than the diluent present in the otherwise identical hydrocarbon stream, where the amount of diluent present in the otherwise identical hydrocarbon stream ranges from 5 wt % to about 30 wt %.

The invention will now be described with respect to particular Examples that are not intended to limit the invention but simply to illustrate it further in various non-limiting embodiments. Unless otherwise noted, all percentages (%) are weight %.

Example 1

Preparing an Approximate 100 Gallon (379 L) Drag Reducing Latex Batch

The drag reducing latex composition was made in a 150 gallon (568 liter) stainless steel reactor. The reactor was thoroughly cleaned and purged prior to manufacture of the product. The reactor was washed with deionized water before charging the raw materials. Only deionized water should be used in the manufacturing of this product, in most non-limiting embodiments. The following steps outline the typical steps.

A surfactant solution of the composition of Table I was charged to the reactor. STANFAX 1025 is available from PARA-CHEM®. TRITON X-100 is a nonionic octylphenol ethoxylate surfactant available from Dow Chemical Company.

TABLE I

| Surfactant Solution | | |
|---|---|---|
| Component | Amount in lbs | Amount in kgs |
| STANFAX 1025 (Sodium lauryl sulfate solution) | 72.27 | 32.78 |
| TRITON X-100 | 11.85 | 5.38 |
| Sodium phosphate monobasic | 0.75 | 0.34 |
| Sodium phosphate dibasic | 0.75 | 0.34 |
| Deionized Water | 344.62 | 156.32 |
| Sodium Bromate | 0.73 | 0.33 |

The charge was followed by a monomer solution with the composition of Table II

TABLE II

| Monomer Solution | | |
|---|---|---|
| Component | Amount in lbs | Amount in kgs |
| Styrene | 0.28 | 0.13 |
| 2-Ethylhexyl methacrylate | 282.67 | 128.22 |
| Acrylic Acid | 0.28 | 0.13 |

The reactor agitator was then turned ON to emulsify the monomer/surfactant solution mixture.

Nitrogen was added to the reactor subsurface to remove any dissolved oxygen, which was measure by an oxygen sensor. Nitrogen sparge was continued for at least 30 minutes past the sensor reaching its low detection limit.

The reactor was then cooled down to 40° F. (4.4° C.) while continuing to sparge with nitrogen.

The reactor was held at 40° F. (4.4° C.) for the duration of the reaction, which was initiated by adding the initiator solution described in Table III, ensuring that the vessel containing the initiator solution was purged with nitrogen prior to beginning infusion.

TABLE III

| Composition of the Initiator Solution | | |
|---|---|---|
| Component | Amount in lbs | Amount in SI units |
| Sodium metabisulfite | 0.02 | 9.1 g |
| Deionized water | 5.69 | 2.58 kg |

The initiator solution was fed into the reactor at a rate of 25% of its volume per hour, in this case a rate of approximately 0.17 gallons per hour (0.64 L/hr).

Once the exotherm began, as detected by measuring the temperature of the reactor contents, the temperature was monitored and the initiator solution was continually fed until about 0.5 gallons (about 1.9 liters) had been added.

After the exotherm had peaked and the temperature of the reactor contents dropped back to 40° F. (4.4° C.), the reactor's temperature was raised to 90° F. (32° C.) and the initiator solution was fed until it been fully consumed.

The reactor contents were then cooled to ambient temperature.

JEFFAMINE® T-403 polyetheramine and 2-ethylhexanol were added to the product and mixed into the product before discharging, in the amounts shown in TABLE IV.

TABLE IV

| Component | Amount in lbs | Amount in SI units |
|---|---|---|
| JEFFAMINE T-403 | 0.08 | 36 g |
| 2-Ethylhexanol | 80 | 36 kg |

The product was discharged through a 10 micron bag filter into a storage container.

Example 2

Pumping Plasticized and Non-Plasticized Drag Reducing Latex Compositions

Non-plasticized drag reducing latex compositions were prepared similar to Example 1, except that 2-ethylhexanol was not added at the end. Several batches were made of each composition to accumulate for a 250 gallon (946 liter) tote. Pump testing was conducted using a standard C-Frame FLO Injection skid which features plunger pumps and liquid ends with suction and discharge check valves. The test regimen was as follows. The tote containing approximately 250 gallons (946 liters) of product was connected to the suction of the injection skid using a flexible hose. The desired flow rate in gallons per hour (GPH, or liters per hour LPH) was set on the controller and could be monitored using the mass meter. The mass meter is also capable of totaling the volume of material pumped. The discharge of the pump skid featured a high pressure relief valve, which applied back pressure, to simulate injection into a high pressure pipeline. The discharge from the high pressure relief valve then went back into the 250 gallon (946 liter) tote. The key parameter for success in this Example was the number of gallons of product injected without the pump failing.

Test #1 was conducted as described above using a non-plasticized drag reducing latex composition, starting at 43 GPH (163 LPH) flow rate and then lowered to 25 GPH (94 LPH). The injection system shutdown after 116 gallons (439 liters) injected. The pump inlet, outlet and check valves were broken down for inspection. Hard and brittle pieces of polymer were found inside the check valves. This is not desirable.

Test #2 was conducted using a non-plasticized drag reducing latex composition, similar to the first test, except now a diaphragm booster pump, placed between the tote and the injection skid, was used to feed the injection pumps. The booster pump was set at 40 psig (0.27 MPa) and the flow rate was set at 50 GPH (189 LPH). The injection failed after 86 gallons (326 liters) of product was injection. The pump inlet, outlet and check valves were broken down for inspection. Hard and brittle pieces of polymer were found inside the check valves again. In addition, the plunger and packing were also inspected and it was found that the latex polymer was agglomerating and fusing into a hard polymer at the plunger/packing interface. These hard and brittle polymer pieces were then dislodging and getting trapped inside the check valves leading to injection failure.

Test #3 utilized the inventive plasticized drag reducing latex composition described in Example 1. The test was started at a flow rate of 67 GPH (254 liters) and 163 gallons (617 liters) were pumped before the skid was intentionally turned off at the end of the day. The skid was turned ON the next day and intentionally stopped at 516 gallons (1.95 kiloliters) total injected. The skid was restarted and stopped on the following day with the total at 1004 gallons (3.801 kiloliters). With this confidence the injection skid was restarted the following day to left to run continuously for another 10 days. In this period, the flow rate was initially adjusted down 20 GPH (76 LPH) and then increased to 50 GPH (189 liters) in increments of 10 GPH (38 LPH) every 24 hours or so. This was done to simulate conditions where the treatment rates would be changing. Further the flow rates were decreased stage-wise back to 20 GPH (76 LPH). At the end of the approximate 2 week period in Test #3, the injection skid had pumped 6062 gallons (22.95 kiloliters) of the plasticized drag reducing latex without a single failure and 5058 of those gallons (19.15 kiloliters) had been pumped in one continuous run. In conclusion, the comparative data from the three tests clearly indicates that the inventive plasticization effect greatly improves the pumpability of the drag reducing latex formulation. Stated another way, the inventive composition and method provided assured flow.

Many modifications may be made in the methods and compositions of this invention without departing from the spirit and scope thereof that are defined only in the appended claims. For example, the hydrocarbon types, drag reducing latexes, monomers, plasticizers, diluents, polyetheramines, and viscosity reducers (stabilizers) may be different from those mentioned and used here, and used in different proportions from those mentioned and used here, and still be within the methods and compositions described.

The words "comprising" and "comprises" as used throughout the claims is interpreted as "including but not limited to".

The present invention may suitably comprise, consist or consist essentially of the elements disclosed and may be practiced in the absence of an element not disclosed. For instance, there may be provided a hydrocarbon stream having reduced drag that consists essentially of or consists of a liquid hydrocarbon selected from the group consisting of crude oil, heavy oil, gasoline, diesel fuel, fuel oil, naphtha, and mixtures thereof and an effective amount of a drag reducing composition to reduce the drag of the hydrocarbon, where the drag reducing composition comprises, consists essentially of or consists of a drag reducing latex comprising at least one plasticizer in an amount effective to improve the ability to pump the latex into the hydrocarbon stream, e.g. with assured flow.

In another non-limiting embodiment there may be alternatively provided a method of preparing a hydrocarbon composition consisting essentially of or consisting of introducing into a liquid hydrocarbon an effective amount of a drag reducing composition to reduce the drag of the hydrocarbon composition where the liquid hydrocarbon is selected from the group consisting of crude oil, heavy oil, gasoline, diesel fuel, fuel oil, naphtha, and mixtures thereof, and where the drag reducing composition comprises, consists essentially of or consists of a drag reducing latex comprising at least one plasticizer in an amount effective to improve the ability to pump the latex into the hydrocarbon stream, e.g. with assured flow.

What is claimed is:

1. A hydrocarbon composition having reduced drag comprising:
   a liquid hydrocarbon selected from the group consisting of crude oil, heavy oil, gasoline, diesel fuel, fuel oil, naphtha, asphalt, and mixtures thereof; and
   an effective amount of a drag reducing composition to reduce the drag of the liquid hydrocarbon, the drag reducing composition comprising:
      a drag reducing latex comprising:
         a polymer having at least one monomer selected from the group consisting of acrylates, methacrylates, 2-ethylhexyl methacrylate, isobutyl methacrylate, butyl methacrylate, 2-ethylhexyl acrylate, isobutyl acrylate, butyl acrylate, C1 to C6 alcohol esters of acrylic acid or methacrylic acid, styrene, acrylic acid, and combinations thereof;
         at least one plasticizer in an amount effective to improve the ability to pump the drag reducing latex into the liquid hydrocarbon, where the weight ratio of the at least one plasticizer to drag reducing latex ranges from about 1/99 to about 10/90; and
      at least one polyetheramine.

2. The hydrocarbon composition of claim 1 where:
   the at least one plasticizer is selected from the group consisting of glycols, polyglycols, glycol ethers, esters, aliphatic alcohols, aromatic alcohols, ketones, aldehydes, paraffinic and isoparaffinic solvents, white and mineral spirit blends, aromatic solvents, and combinations thereof.

3. The hydrocarbon composition of claim 1 where the effective amount of the drag reducing composition in the hydrocarbon ranges from about 1 ppm to about 500 ppm.

4. The hydrocarbon composition of claim 1 where:
   the liquid hydrocarbon is a crude oil with an asphaltene content of at least 3 wt %,
   the hydrocarbon composition further comprises at least one diluent, and
   the hydrocarbon composition further comprises at least one viscosity reducer,
   where the amount of the at least one diluent is reduced as compared to an otherwise identical hydrocarbon composition absent the at least one plasticizer, where the hydrocarbon composition and the otherwise identical hydrocarbon composition have essentially the same drag characteristics when pumped under essentially the same conditions.

5. The hydrocarbon composition of claim 4 where the amount of diluent in the hydrocarbon composition is at least about 2 wt % less than the diluent present in the otherwise identical hydrocarbon composition, where the amount of diluent present in the otherwise identical hydrocarbon composition ranges from 5 wt % to about 30 wt %.

6. The hydrocarbon composition of claim 1 where:
   the hydrocarbon composition further comprises at least one diluent selected from the group consisting of gasoline, natural gasoline, naphtha, condensate, and combinations thereof;
   the hydrocarbon composition further comprises at least one viscosity reducer selected from the group consisting of phenol formaldehyde resins; phenol formaldehyde resins substituted with alkyl groups ranging from butyl to dodecyl; phenol formaldehyde resins oxyalkylated with an alkylene oxide selected from the group consisting of ethylene oxide, propylene oxide, butylene oxide, styrene oxide, glycidyl ethers, diglycidyl ethers and combinations thereof, where the ratio of alkylene oxide to phenol ranges from 1 to 20 per mole of alkylene oxide to phenol; Mannich reaction products; bases selected from the group consisting of imidazolines, polyamines, tetra ethyl pentamine, magnesium overbases; and combinations thereof; and the at least one viscosity reducer is present in an amount from about 1 ppm to about 10,000 ppm.

7. The hydrocarbon composition of claim 6 where the amount of the at least one plasticizer in the drag reducing latex ranges from about 5 wt % to about 20 wt %, based on the total amount of the drag reducing latex.

8. The hydrocarbon composition of claim 6 where the weight ratio of the drag reducing composition to the viscosity reducer ranges from about 50/50 to about 99.999/0.001.

9. The hydrocarbon composition of claim 1 where the drag reducing latex comprises water and at least one winterizing additive selected from the group consisting of ethylene glycol, propylene glycol, and mixtures thereof.

10. A hydrocarbon composition having reduced drag comprising:
    a liquid hydrocarbon selected from the group consisting of crude oil, heavy oil, gasoline, diesel fuel, fuel oil, naphtha, asphalt, and mixtures thereof; and
    from about 1 ppm to about 500 ppm of a drag reducing composition to reduce the drag of the liquid hydrocarbon, the drag reducing composition comprising:
       a drag reducing latex comprising:
          at least one plasticizer where the weight ratio of the at least one plasticizer to drag reducing latex ranges from about 1/99 to about 10/90; and
       at least one polyetheramine;
    where:
       the drag reducing latex comprises a polymer having acrylic acid and at least one other monomer selected from the group consisting of acrylates, methacrylates, 2-ethylhexyl methacrylate, isobutyl methacrylate, butyl methacrylate, 2-ethylhexyl acrylate, isobutyl acrylate, butyl acrylate, C1 to C6 alcohol esters of acrylic acid or methacrylic acid, styrene, and combinations thereof; and
       the at least one plasticizer is selected from the group consisting of glycols, polyglycols, glycol ethers, esters, aliphatic alcohols, aromatic alcohols, ketones, aldehydes, paraffinic and isoparaffinic solvents, white and mineral spirit blends, aromatic solvents, and combinations thereof.

11. A method of preparing a hydrocarbon composition, the method comprising:
    forming a drag reducing latex by polymerizing at least one monomer selected from the group consisting of acrylates, methacrylates, 2-ethylhexyl methacrylate, isobutyl methacrylate, butyl methacrylate, 2-ethylhexyl acrylate, isobutyl acrylate, butyl acrylate, C1 to C6 alcohol esters of acrylic acid or methacrylic acid, styrene, acrylic acid, and combinations thereof to give the drag reducing latex; and
    introducing into a liquid hydrocarbon an effective amount of a drag reducing composition to reduce the drag of the liquid hydrocarbon where:
       the liquid hydrocarbon is selected from the group consisting of crude oil, heavy oil, gasoline, diesel fuel, fuel oil, naphtha, asphalt, and mixtures thereof; and
       the drag reducing composition comprises:
          the drag reducing latex comprising at least one plasticizer in an amount effective to improve the ability to pump the drag reducing latex into the liquid hydrocarbon composition containing the drag reducing composition, where the weight ratio of the at least one plasticizer to the drag reducing latex ranges from about 1/99 to about 10/90; and at least one polyetheramine.

12. The method of claim 11 where the method further comprises:
introducing the at least one plasticizer into the drag reducing latex, where the at least one plasticizer is selected from the group consisting of glycols, polyglycols, glycol ethers, esters, aliphatic alcohols, aromatic alcohols, ketones, aldehydes, paraffinic and isoparaffinic solvents, white and mineral spirit blends, aromatic solvents, and combinations thereof.

13. The method of claim 11 where the effective amount of the drag reducing latex in the liquid hydrocarbon ranges from about 1 ppm to about 500 ppm.

14. The method of claim 11 where the method further comprises:
diluting at least one monomer with at least one plasticizer, where the at least one plasticizer is a solvent for both the at least one monomer and a polymer formed from the monomer, and
polymerizing the at least one monomer in the presence of the at least one plasticizer, where the at least one monomer is selected from the group consisting of acrylates, methacrylates, 2-ethylhexyl methacrylate, isobutyl methacrylate, butyl methacrylate, 2-ethylhexyl acrylate, isobutyl acrylate, butyl acrylate, C1 to C6 alcohol esters of acrylic acid or methacrylic acid, styrene, acrylic acid, and combinations thereof.

15. The method of claim 14 where the at least one plasticizer is selected from the group consisting of kerosene, toluene, xylene, C6-C16 alkanes or cycloalkanes, mineral oil solvents, and combinations thereof.

16. The hydrocarbon composition of claim 1 where at least one monomer in the polymer is acrylic acid.

17. The method of claim 11 where at least one monomer in forming the drag reducing latex by polymerizing is acrylic acid.

18. The method of claim 11 where the drag reducing latex comprises water and at least one winterizing additive selected from the group consisting of ethylene glycol, propylene glycol, and mixtures thereof.

* * * * *